United States Patent
Prat et al.

(12) 
(10) Patent No.: US 6,409,822 B1
(45) Date of Patent: *Jun. 25, 2002

(54) AQUEOUS SUSPENSION INCLUDING A MIXTURE OF AT LEAST ONE AQUEOUS SUSPENSION OF PRECIPITATED SILICA AND OF AT LEAST ONE LATEX

(75) Inventors: Evelyne Prat, Pantin; Laurent Frouin, L'Hay les Roses, both of (FR)

(73) Assignee: Rhodia Chimie, Courbevoie Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,840

(22) PCT Filed: Mar. 13, 1997

(86) PCT No.: PCT/FR97/00452

§ 371 (c)(1),
(2), (4) Date: Feb. 4, 1999

(87) PCT Pub. No.: WO97/34849

PCT Pub. Date: Sep. 25, 1997

(30) Foreign Application Priority Data

Mar. 15, 1996 (FR) .......................... 96 03309

(51) Int. Cl.[7] .............................. C04B 40/00
(52) U.S. Cl. .................. 106/737; 106/788; 523/334; 524/543
(58) Field of Search ................. 523/334; 524/543; 106/737, 788

(56) References Cited

U.S. PATENT DOCUMENTS

| | | | |
|---|---|---|---|
| 3,700,690 A | * 10/1972 | Burke, Jr. ............ 260/33.6 AO |
| 3,907,734 A | * 9/1975 | Ten Broeck et al. |
| 3,984,366 A | * 10/1976 | Elmer |
| 4,274,883 A | * 6/1981 | Lumbeck et al. |
| 4,482,657 A | * 11/1984 | Fischer et al. ............. 523/334 |
| 4,504,614 A | * 3/1985 | Padget ...................... 524/284 |
| 5,075,358 A | * 12/1991 | Riley et al. ................... 524/5 |
| 5,149,370 A |   9/1992 | Olaussen et al. |
| 5,176,752 A |   1/1993 | Scheiner |
| 5,185,389 A | * 2/1993 | Victor ............................ 524/2 |
| 5,190,818 A | * 3/1993 | Sakui ........................ 428/355 |
| 5,366,550 A | * 11/1994 | Schad ........................ 106/730 |
| 5,721,309 A | * 2/1998 | Sharma et al. .............. 524/506 |
| 5,763,388 A | * 6/1998 | Lightsey et al. ............ 523/212 |
| 5,925,708 A | * 7/1999 | Esch et al. ................. 524/493 |
| 5,985,953 A | * 11/1999 | Lightsey et al. ............ 523/212 |

FOREIGN PATENT DOCUMENTS

| | | | |
|---|---|---|---|
| DE | 1240652 | * 5/1967 | |
| DE | 90 13 775 | 4/1991 | |
| DE | 4214334 | * 11/1993 | |
| EP | 269015 | * 6/1988 | |
| EP | 0 454 057 | 10/1991 | |
| EP | 0 560 602 | 9/1993 | |
| JP | 2157145 | * 6/1990 | ........... C04B/22/06 |
| NL | 271050 | * 7/1964 | |
| WO | 95 25700 | 9/1995 | |
| WO | 96 01787 | 1/1996 | |

OTHER PUBLICATIONS

Patent Abstracts of Japan, vol. 014, No. 412 (C–0755) & JP 02 157145A (Lion Corp.) 6/90.

Database WPI, Week 9036, Derwent Publications Ltd., London, GB, AN 90–268519 XP002018489 & DD 277 267 A (Bauakad DDR BAUSTOF) 3/90.

Database WPI, Week 8629, Derwent Publications Ltd., London, GB, AN 86–185369, XP002018490 & JP 61 117 143 (Denki Kagaku KK) 6/86.

* cited by examiner

*Primary Examiner*—David W. Wu
*Assistant Examiner*—Kelechi Egwim
(74) *Attorney, Agent, or Firm*—Burns, Doane, Swecker & Mathis, L.L.P.

(57) ABSTRACT

An aqueous suspension is provided including a mixture of at least one aqueous suspension of precipitated silica and of at least one latex, in which the aqueous suspension of precipitated silica has a solids content of between 10 and 40% by weight, has a viscosity lower than $4 \times 10^{-2}$ Pa s at a shear of $50 \, s^{-1}$ and, after centrifuging at 7500 revolutions per minute for 30 minutes, produces a supernatant containing more than 50% of the weight of the silica initially in suspension.

This suspension can be employed in compositions based on an inorganic binder and in concrete compositions.

11 Claims, No Drawings

AQUEOUS SUSPENSION INCLUDING A MIXTURE OF AT LEAST ONE AQUEOUS SUSPENSION OF PRECIPITATED SILICA AND OF AT LEAST ONE LATEX

The present invention relates to aqueous suspensions including precipitated silica and to their use in the preparation of compositions based on cement or on similar inorganic binder or compositions derived therefrom.

The invention applies to all types of compositions including an inorganic binder such as cement, a slag or the like, as base ingredient or in combination with other constituents.

For the purpose of the present description "cement composition" will be intended to mean a composition based on cement or any other similar inorganic binder and water. These compositions constitute products which are used as they are, especially as coating, or else which are intended to incorporate especially inorganic fillers of variable particle size.

Such compositions enclosing an inorganic binder and an inorganic filler in granulate form are considered very generally as concretes.

Although the specialist customarily describes concrete more specifically as a composition in which the inorganic filler is based on relatively coarse granulates (of the order of 4 to 15 mm), and mortar as a composition in which the inorganic filler is based on less coarse granulates (smaller than 4 mm), the term "concrete" will be employed in the present description without any distinction to denote all kinds of compositions, whatever their particle size, in order to simplify the description.

It is desirable to have the ability to control the properties of these various compositions both during their manufacture and their use, as well as the products derived therefrom after setting.

Thus, concrete compositions for large structures (production of walls, veils, posts, cement finishes, slabs, industrial floors) must satisfy individual requirements with regard to:
  rapid setting kinetics for early removal of shuttering;
  low plastic shrinkage and absence of cracks particularly in the case of cement finishes;
  good mechanical properties at 28 days;
  durability (resistance to abrasion, low permeability to gases and to liquids);
  leakproofing in the particular case of the underground concretes or marine concretes in contact with water.

In addition, the concretes may either be manufactured on the work site or manufactured in a central plant and transported to the site of use (concrete ready for use). In order that the composition may retain acceptable properties, even for a short period, its stability in the hydrated state must be ensured, especially by preserving its fluidity intact and by limiting the segregation of the materials in suspension.

More specifically, architectural concretes, that is to say visible concretes, must additionally satisfy requirements where aesthetics are concerned:
  homogeneous surface appearance;
  reduction of efflorescences which form surface salt deposits (in particular in the case of acid-treated concretes).

Prefabricated concretes for the production of facade components, paving stones, slabs and pipes must more particularly have a low permeability to gases and to liquids for an optimum durability, as well as the same aesthetic properties as the architectural concretes for the visible components.

The mortar or rendering compositions for the secondary work (finishing renderings, smoothing renderings, facade renderings, adhesive mortars, spray renderings) must themselves also satisfy a certain number of individual requirements:
  good water retention to avoid the loss of water by entry into the porous substrate or by preferential surface drying (risk of cracking and of surface powder formation);
  good adhesiveness to the substrate;
  resistance to abrasion and impact strength;
  good fluidity combined with good water retention (especially in the case of smoothing renderings), these contradictory properties being difficult to obtain together.

In general, during the utilization, critical parameters are the fluidity to ensure the processing, the degree of bleeding or the adhesiveness to the substrate and water retention.

To satisfy these requirements, appropriate additives are usually incorporated into cement compositions or in compositions derived therefrom. However, it is not rare for an additive to produce, besides the positive effect for which it is employed, a detrimental effect on another property. Thus, a plasticizing agent may improve the fluidity of a composition, but the high contents sometimes necessary to reach the desired result very clearly promote bleeding and diminish the setting kinetics and hence the acquisition of mechanical strength at an early age (fight against cracking, suitability for removal of shuttering, early commissioning, etc.).

Similarly, setting retarders which allow a composition to be conserved and transported for a certain time after its preparation also have a very marked effect on bleeding and on the setting kinetics.

Such difficulties appear in particular in the case of cement-based compositions and of self-levelling fluid concretes which, according to conventional specifications, must exhibit strict rheological characteristics in respect of settling (measured with the Abrams cone) or static or dynamic spreading.

The solutions which make it possible to obtain fluid concretes or mortars, and which are known so far, consist either in optimizing the particle size curve by the introduction of fines or of ultrafines as described in patent EP-A-0 184 386, this solution exhibiting, besides the awkwardness of making it necessary to handle large quantities of powder, the disadvantage of being highly sensitive to small variations in the content or quality of the products employed, which in practice makes it difficult to employ on a work site, or to add large quantities of plasticizers, retarders and optionally water-retaining agents to maintain the handleability of the material for a sufficient period, which generally entails a delay in setting which impairs the efficiency of the work site (delayed removal of shuttering or need for finishing in the case of early shuttering removal) and a great sensitivity to small changes around the optimized composition.

In practice, one is often confronted with problems of prohibitive decrease in the handleability in the event of metering error, of segregation of the mortar or of the concrete, of high bleeding, of lengthening of the setting time and of lowering of the final mechanical properties, in particular in the event of overdosing with water.

In fact, it is found very difficult to produce cement compositions or compositions derived therefrom, which meet all the essential requirements that are desired with a view to an application.

From U.S. Pat. No. 5,149,370 and GB-2 212 489 it was known to improve the bleeding and segregation properties of compositions by adding silica sols thereto. However, the properties of these compositions were still inadequate.

The present invention proposes to meet this demand for improved additives which make it possible to combine a number of advantageous properties from among those referred to above.

The aim of the invention is to provide a new additive for cement compositions or compositions derived therefrom, making it possible to decrease the bleeding and segregation effects of the concrete compositions.

A further object of the invention is to provide an additive making it possible to combine an improved fluidity, good water retention, even in the case of high contents of water and/or of fluidizing or plasticizing agents, and to impart a good durability to the set product, especially a reduction in the permeability to water and to gases, making it possible to reduce the efflorescences.

To this end, a further object of the invention is an aqueous suspension including a mixture of at least one aqueous suspension of precipitated silica and of at least one latex, in which the said aqueous suspension of precipitated silica has a solids content of between 10 and 40% by weight, has a viscosity lower than $4 \times 10^{-2}$ Pa s at a shear of 50 $s^{-1}$, and, after centrifuging at 7500 revolutions per minute for 30 minutes, produces a supernatant containing more than 50 % of the weight of the silica initially in suspension.

The first essential component of the mixture forming the aqueous suspension which is the subject-matter of the invention is an aqueous suspension of precipitated silica of high solids content, exhibiting a low viscosity and good stability with time.

Such suspensions are described, together with the process for their manufacture, in FR-A-2 722 185.

The solids content of the said suspension is preferably between 15 and 35% by weight. The viscosity of the said suspension is advantageously lower than $4 \times 10^{-2}$ Pa s at a shear of 50 $s^{-1}$.

These suspensions are very stable and their stability can be assessed by virtue of a sedimentation test which consists in centrifuging the said suspension at 7500 rev/min for 30 minutes. The quantity of silica present in the supernatant obtained at the end of this centrifuging, measured after drying the supernatant at 160° C. until a constant weight of material is obtained, represents more than 50%, preferably more than 60% of the weight of the silica present in the suspension.

The quantity of silica present in the supernatant obtained after centrifuging advantageously represents more than 70%, in particular more than 90% of the weight of the silica in suspension.

Another essential feature of these suspensions concerns the particle size of the silica particles in suspension.

In fact, besides their high viscosity, the concentrated silica suspensions known so far exhibit the disadvantage of comprising large-sized agglomerates in suspension, which give rise to sedimentation in the course of time.

The particle size distribution of the materials in suspension can be defined by means of the median diameter $D_{50}$, which is the -particle diameter such that 50% of the population of particles in suspension have a smaller diameter.

Similarly, $D_{95}$ denotes the particle diameter such that 95% of the population of particles in suspension have a smaller diameter.

Another characteristic value of the suspensions is the deagglomeration factor $F_D$. This factor, which is proportionally higher the more the silica suspension is deagglomerated, is indicative of the proportion of fines, that is to say of the proportion of particles smaller than 0.1 $\mu$m in size, which are not detected by a commonplace particle size analyser.

The particle size characteristics of the silica suspensions are determined by virtue of a particle size measurement performed on the suspensions with the aid of a Sympatec particle size analyser.

$F_D$ is measured by introducing into a particle size analyser a known volume V of suspension diluted so as to obtain a silica content of 4% by weight, and is equal to the ratio (10×V in ml/optical concentration detected by the particle size analyser).

The silica agglomerates present in these suspensions are of small size.

The particle size distribution of the agglomerates in suspension is preferably such that their median diameter $D_{50}$ is smaller than 5 $\mu$m and the deagglomeration factor $F_D$ is higher than 3 ml.

Advantageously, the diameter $D_{50}$ is smaller than 2 $\mu$m, the factor $F_D$ is greater than 13 ml and, in addition, the diameter $D_{95}$ is smaller than 20 $\mu$m.

The second essential component of the mixture forming the aqueous suspension which is the subject-matter of the invention is a latex, namely an aqueous suspension of particles of natural or synthetic resin.

The said particles are advantageously products of polymerization of at least one monomer containing ethylenic unsaturation.

The latex itself is preferably produced by emulsion polymerization of at least one monomer containing ethylenic unsaturation.

In particular, the monomer containing ethylenic unsaturation may be advantageously selected from styrene, butadiene, acrylic acid, methacrylic acid, esters, preferably $C_1$–$C_{12}$, of acrylic or methacrylic acid, vinyl esters and mixtures thereof.

The latex which can be employed in accordance with the invention may also include particles of homopolymer or copolymer resin, an example being a styrene-butadiene rubber latex.

The particle size of the latex can vary in accordance with the intended application. In a first advantageous embodiment this size is from 0.1 to 5 $\mu$m. Latices in which the particle size is from 0.1 to 0.3 $\mu$m may be mentioned in particular, preferably styrene/utadiene latices, or else latices in which the particle size is from 1 to 5 $\mu$m, preferably acetate/versatate latices. In a second advantageous embodiment this size is at most 100 nm; these nanolatices may be of very diverse nature.

The abovementioned two components are used in combination in proportions which are appropriate for the desired application.

In general it is preferable that the aqueous suspension according to the invention should include from 3 to 25 parts by weight of silica, expressed as dry weight, per 100 parts by weight of suspension, more advantageously from 5 to 20 parts by weight of silica per 100 parts of suspension.

It is preferable, furthermore, that the dry weight of the latex should represent the value of 5 to 50 parts per 100 parts by weight of aqueous suspension according to the invention, advantageously from 10 to 40 parts per 100 parts of suspension.

The aqueous suspensions according to the invention may be incorporated into cement pastes or more generally cement compositions based on inorganic binder and water, which they provide especially with resistance to segregation and water retention, in combination with an increase in fluidity as a result of a synergistic effect between the silica suspension and the latex.

The invention therefore also provides compositions based on an inorganic binder and water, which are characterized in that they include an aqueous suspension as defined above.

The inorganic binder may be of any known type, especially cement of Portland CPA H.P, CPA 55, CPJ 45, CPA CEM I, CPA CEM I PM, CPA CEM I PMES, CPJ CEM II, CPJ CEM II PM, CPJ CEM II PMES, CHF CEM II and CLK CEM II type, blast furnace slag or pozzolanic binders. The ratio of the water to the binder is variable and depends above all on the desired fluidity of the composition. This ratio may be in particular from 0.3 to 2, preferably from 0.3 to 1.5.

In these compositions it is preferable that the silica should represent from 0.3 to 5% by weight relative to the binder, expressed in relation to dry weight, preferably from 0.8 to 1.5%.

It is also advantageous that the dry weight of the latex should represent the value of 0.2 to 50% by weight relative to the binder, expressed in relation to dry weight, preferably from 3 to 30%.

To supplement the effect provided by the aqueous suspension according to the invention, the compositions may additionally include at least one plasticizing agent. This agent may be selected from the substances commonly employed for this purpose in cement compositions. It will advantageously be selected from lignosulphonates, casein, polynaphthalene, in particular alkali metal polynaphthalene sulphonates, melamines, polymelamines, formaldehyde derivatives, alkali metal polyacrylates, alkali metal polycarboxyates and grafted polyethylene oxides.

Such an agent may advantageously be employed in a proportion of 0.1 to 10% by weight relative to the binder.

This agent may be introduced separately from the aqueous suspension according to the invention or else simultaneously by means of a suspension including the silica suspension, the latex and the said agent at the same time.

Similarly, the compositions may additionally include at least one water-retaining agent which may be selected from substances commonly employed for this purpose in cement-based compositions. It will advantageously be selected from optionally modified polyvinyl alcohols, polyethylene glycols, polyoxyethylenes, acrylic polymers, especially polyacrylamides, polysaccharides of bacterial origin, like xanthan gum, guar gums, cationized guar gums, carob seed extracts, alginates, pectins, celluloses, cellulose ethers, especially carboxyalkyl celluloses, alkyl celluloses, hydroxyalkyl celluloses such as methylhydroxypropyl celluloses, polyvinylpyrrolidone, sugars, especially dextrose, ribose, corn starches, wheats, cationized or otherwise, lignites, leonhardites and derived products, alkali metal polyacrylates and polystyrenesulphonates.

Such an agent may advantageously be employed in a proportion of 0.01 to 10% by weight relative to the binder.

Furthermore, the compositions may also advantageously include a setting accelerator such as aluminium sulphate, in a content of 0.01 to 3% by weight relative to the binder (expressed in relation to dry weight). In the case of aluminium sulphate this content is expressed as weight of anhydrous aluminium sulphate.

This agent may be introduced separately from the aqueous suspension according to the invention or else simultaneously by means of a suspension including the silica suspension, the latex and the said agent at the same time.

Reinforcing fibres enabling the resistance to cracking to be improved will also advantageously be employed in the compositions. These fibres are preferably selected from polyvinyl alcohol, polypropylene, polyethylene, steel, polyacrylonitrile, cellulose, carbon, kevlar, polyamide and polyester fibres.

The cement compositions based on an inorganic binder and water which have just been described can be employed as such or combined with other materials, especially to form concrete (or mortar) compositions. As has been explained above, concrete is intended to mean the mixture of an inorganic binder, water and granulates of variable particle size, especially sand gravel mixes, sands and optionally fines, or even ultrafines.

In this regard a further object of the invention is concrete compositions including an aqueous suspension described above. These compositions can be obtained by mixing the suspensions according to the invention with an inorganic binder, granulates and optionally additional water, or else by mixing a cement composition described above with granulates and optionally additional water.

Consequently another object of the invention is the use of the aqueous suspensions or of the cement compositions described above in concrete compositions, in particular speciality concretes of the abovementioned types and secondary work coats.

Aqueous suspensions or cement compositions will advantageously be employed which correspond to at least one of the preferred characteristics indicated above with regard to the relative contents of silica and latex, and optionally of plasticizing or water-retaining agents and, where appropriate, of cement.

The proportion of granulates in these concrete compositions may be chosen in a manner known per se within the usual ranges corresponding to the desired type of concrete.

The invention finds a particular application in so-called speciality concretes which must exhibit particular properties with regard to surface appearance, mechanical strength, durability of the finished product, fluidity in processing and low tendency to segregation.

It is possible, for example, to mention fluid concretes, concretes for the manufacture of slabs (cement finishes and fluid mortars for finishes), submarine concretes which must be easily pumpable and injectable, facing concretes, concretes prefabricated by centrifuging or hot pressing, surface smoothing and finishing coats, especially for floors, coloured concretes which must have a homogeneous surface without efflorescence and a relatively light base colour, as well as lightweight concretes, concretes for industrial floors, leakproof concretes and cementing concretes for oil wells, which must have a low porosity, the properties of all these concretes being seen to be improved by virtue of the invention.

More particularly, in the case of fluid concretes and cements, the high fluidity which is frequently desirable is obtained by virtue of the invention while the ability of the compositions to retain water is improved, and this makes it possible to facilitate the positioning and to reduce the problems of cracking due to a loss of water entailing a plastic shrinkage shortly after the positioning.

A further object of the invention is thus the use of the aqueous suspensions described above as water-retaining agent in cement compositions or concretes. This use, which makes it possible to reduce plastic shrinkage and, as a result, cracking, is particularly advantageous for cement finishes and smoothing coats.

The advantageous properties imparted to the cement-based compositions and to the concrete compositions by the aqueous suspensions according to the invention include more particularly the low tendency for the segregation of the hydrated compositions, especially compositions with a high water content.

In this regard, a further object of the invention is the use of aqueous suspensions as defined above, as antisegregation agent in cement compositions based on an inorganic binder and water and in concrete compositions, especially in compositions where the water/cement, or more generally water/binder, weight ratio is from 0.3 to 2, preferably from 0.3 to 1.5.

The invention is also very advantageous for the production of prefabricated facing concretes or leakproof concretes, because it makes it possible to obtain better dispersion of the cement and better homogeneity. The surface appearance is thus improved in terms of uniformity and durability of the set product by virtue of the limited entry of water and of gases.

In the case of the facing products and of smoothing and finishing coats, this is accompanied by a lightening of the colour and an improvement in surface appearance, by better resistance to carbonate formation and a limitation in the appearance of efflorescences, as well as a reduction in the corrosion of the reinforcements.

Another subject-matter of the invention is the use of aqueous suspensions described above as agent for reducing the permeability to gases and to liquids in the compositions based on an inorganic binder and water and in concrete compositions.

The resistance to the entry of water is a decisive advantage for the leaktightness of structures situated in a region liable to flooding or wet or of structures intended to receive water (reservoirs, dams, aqueducts, swimming pools and water conduits).

Other advantages of the invention will appear more clearly in the light of the examples which follow.

EXAMPLE OF PREPARATION

Preparation of a Suspension of Precipitated Silica

1. A cake C1 of precipitated silica is prepared as follows.

Into a stainless steel reactor fitted with a stirring system using propellers and with heating using a jacket are introduced:

346 litres of water, 7.5 kg of $Na_2SO_4$ (electrolyte), 587 litres of aqueous sodium silicate which has an $SiO_2$/$Na_2O$ weight ratio equal to 3.50 and a relative density at 20° C. equal to 1.133.

The silicate concentration (expressed as $SiO_2$) in the base stock is then 85 g/l. The mixture is heated to 79° C. while being kept stirred. 386 litres of dilute sulphuric acid with a relative density at 20° C. of 1.050 are then introduced into the mixture until a pH value of 8 (measured at the temperature of the mixture) is obtained. The temperature of the reaction mixture is 79° C. during the initial 25 minutes and is then raised from 79° C. to 86° C. over 15 min, and then maintained at 86° C. until the end of the reaction.

Once the pH value of 8 has been reached, 82 litres of aqueous sodium silicate with an $SiO_2/Na_2O$ weight ratio of 3.50 and a relative density at 20° C. of 1.133 and 131 litres of acid of the type described above are introduced jointly into the reaction mixture, this simultaneous introduction of acid and of silicate being carried out in such a way that the pH of the reaction mixture is constantly equal to 8±0.1. After all the silicate has been introduced, the dilute acid continues to be introduced for 9 min so as to bring the pH of the reaction mixture to a value of 5.2. The introduction of acid is then stopped and the reaction slurry is kept stirred for an additional 5 min.

The total duration of the reaction is 118 min.

A slurry of precipitated silica is obtained which is filtered and washed by means of a filter press in such a way that a silica cake G1 is finally recovered, whose loss on ignition is 78% (hence a solids content of 22% by weight) and whose $Na_2SO_4$ content is 1% by weight.

2. 4 kg of the cake G1 (obtained by press filtration and exhibiting a solids content of 22% by weight and a $Na_2SO_4$ content of 1% by weight), preheated to 60° C., are introduced into a Cellier crumbler mixer.

Then, during the deflocculation of the cake, 13.1 ml of a solution of sodium aluminate (which has an $Al_2O_3$ content of 22% by weight and a $Na_2O$ content of 18% by weight; relative density: 1.505) and 7.47 ml of a solution of sulphuric acid containing 80 g/l (relative density: 1.505) are introduced simultaneously so as to maintain the pH at a value of 6.5.

The $Al/SiO_2$ weight ratio is approximately 2600 ppm.

Maturing is allowed to take place for 20 minutes while the mechanical deflocculation is continued.

The silica suspension G2 obtained is characterized by:

a viscosity of 0.06 Pa s (measured under a shear of 50 $s^{-1}$ for 1 minute);

a particle size such that $D_{10}=5$ µm, $D_{50}=19$ µm, $D_{90}=60$ µm.

After one week's storage, the following are observed:

the formation, at the bottom of the storage container, of a sediment which is excessively difficult, or even impossible, to redisperse;

an increase in the viscosity of the suspension: its viscosity is then 0.45 Pa s (measured under a shear of 50 $s^{-1}$ for 1 minute).

3. The chamber of a Netzch LMEI mill is fed with 2 litres of suspension G2 (taken after the crumbling), exhibiting a solids content of 22% by weight, at a flow rate of 5 litres/h; the filling ratio of the chamber with alumina beads (diameter: 0.6–1 mm) is 75% and the speed of rotation of the shaft is 2000 rev/min.

At the end of this wet milling stage a suspension is obtained, characterized by:

a viscosity of 29 mPa s (measured under a shear of 50 $s^{-1}$ for 1 minute);

a particle size such that $D_{10}=1.13$ µm. $D_{50}=4.1$ µm, $D_{90}=9.33$ µm;

a solids content of 22% by weight;

a quantity of silica found in the supernatant of 63% (according to the test for sedimentation under centrifuging, defined above).

4540 g of the silica suspension thus prepared are introduced into a stirred reactor and the pH is adjusted to 9.5, with stirring, with the aid of concentrated sodium hydroxide solution, to stabilize the mixture.

5000 g of a styrene-butadiene rubber latex with a solids content of 50%, exhibiting a particle size of 0.1–0.2 µm, marketed by Rhône-Poulenc under the name SB 112, are then introduced with stirring at a flow rate of 100 g/min.

After half an hour's stirring the pH is readjusted to 9.5 and a suspension exhibiting a viscosity of 30 mPa s under a shear of 50 $s^{-1}$ is obtained.

This suspension is perfectly stable with regard to sedimentation for more than three months.

It contains approximately 10% by weight (dry) of silica and 26% by weight (dry) of latex.

Example of Application 1

Production of a Facing Concrete

Test 1

A concrete composition is prepared according to the following formula:

| | |
|---|---|
| Granulates (5–15) | 1000 kg |
| Granulates 0–4 (sand) | 800 kg |
| HPR cement | 425 kg |
| Plasticizer (Rheobuild 2000 PF marketed by MBT) (0.1% relative to the weight of cement) | 1.7 kg |
| Water | 147 l |

The granulates are introduced into a Hobart type planetary mixer and are mixed for one minute, then the cement is introduced and mixing is continued for 30 seconds.

Next, while the mixing is continued, the water and the plasticizer are introduced, together with 42.5 kg (10% relative to the cement) of the aqueous suspension from the reference example.

The quantity of silica added corresponds to 1% of the weight of cement introduced.

The water/cement weight ratio of this concrete composition is therefore 0.41.

Test 2

A concrete composition is prepared in a similar manner, the initial water content being increased so as to obtain a water/cement weight ratio of 0.49, the quantity of all the other constituents being kept identical.

Comparative Tests 1 and 2

Compositions similar to those of tests 1 and 2 are prepared, in which the introduction of the aqueous suspension from Example A is omitted but the water/cement ratio is preserved.

The characteristics of these four compositions are evaluated by casting a concrete into identical leakproof moulds and by demoulding after three days.

It is noted first of all that in tests 1 and 2 the fluidity of the concrete is better and the positioning in the shuttering takes place better. Furthermore, in tests 1 and 2 no segregation of granulates or bleeding is observed, and this was hitherto incompatible with good fluidity.

The characteristics of the set concretes are also evaluated. The whiteness of the product is measured by means of a Xenotest calorimeter and quantified by means of the chromatic coordinates $L^*$, $a^*$ and $b^*$ in the CIE 1976 ($L^*$, $a^*$, $b^*$) system as defined by the International Commission on Illumination and listed in the Collection of French Standards (AFNOR) colorimetric colour No. X08-12 (1983).

Better homogeneity of the surface and an appreciable lightening in colour are noted in tests 1 and 2.

Possible formation of efflorescence is verified after 28 days. At this time no efflorescence has appeared in tests 1 and 2, whereas the products of the comparative tests exhibit numerous whitish efflorescences at the surface.

The results are recorded in Table 1 which follows.

TABLE 1

| Test | W/C | Silica suspension (% relative to cement) | Whiteness L | a | b | Efflorescence at 28 days |
|---|---|---|---|---|---|---|
| 1 | 0.41 | 10 | 58 | −0.08 | 3.1 | no |
| 2 | 0.49 | 10 | 58.05 | −0.07 | 3.25 | no |
| comp. 1 | 0.41 | 0 | 55 | −0.00 | 3.8 | yes |
| comp. 2 | 0.49 | 0 | 55 | −0.03 | 3.99 | yes |

It would appear that the combined action of the silica and of the latex contributes a filling of the porosity of the concrete, which sooner or later reduces the efflorescences.

It is also observed that the water and gas permeability of the concretes of tests 1 and 2 is reduced in comparison with those of the comparative tests 1 and 2, which results in greater durability due to resistance to carbonate formation, to attack by corrosive water, etc.

In addition, the adhesiveness of the concrete to a substrate is improved as a result of the presence of the silica suspension and of the latex, as is the resistance to abrasion (decrease in dust formation).

A decrease in the number of cracks, due to an improvement in water retention, is also observed.

Example of Application 2

Production of a Cement Composition of High Water Content (or grout)

This example aims to demonstrate the synergy effect produced by the silica suspension and the latex on the rheological and stability properties of cement pastes with a high water content.

A first series of tests not in accordance with the invention is carried out, showing that the silica or the latex alone do not solve the problems presented by these grouts, which are compared with two tests according to the invention.

Comparative Test 1

A grout is prepared including a silica suspension prepared in the same way as in the example of preparation A but without adding latex. It corresponds to the following formula:

| | |
|---|---|
| HTS cement | 100 g |
| plasticizer (Melmentplast N40) | 2.5 g* |
| setting retarder (Melretard) | 0.8 g* |
| aqueous silica suspension with a solids content of 23% | 5 g |
| water | 24 g |

*marketed by CIA

The water/cement ratio is therefore 0.28.

The water, the plasticizer and the retarder are introduced into a beaker stirred with a paddle and the cement is then added with stirring for 3 minutes. The silica suspension is then introduced with stirring, which is continued for 10 minutes.

Comparative Test 2

A similar grout in which the water/cement ratio is 0.35 is prepared in the same way.

Comparative Test 3

A grout is prepared corresponding to the following formula:

| | |
|---|---|
| HTS cement | 100 g |
| plasticizer (Melmentplast) | 2.5 g |
| retarder (Melretard) | 0.8 g |
| styrene-butadiene latex as 50% aqueous suspension (SB 112) | 5 g |
| water | 25 g |

The water/cement ratio is therefore 0.28. The preparation is similar to the comparative test 1, the latex being introduced instead and in place of the silica suspension.

Test 1

According to the invention, a grout corresponding to the following formula is prepared:

| | |
|---|---|
| HTS cement | 100 g |
| plasticizer (Melmentplast) | 2.5 g |
| retarder (Melretard) | 0.8 g |
| aqueous suspension from example A that is: silica (dry weight) 1 g latex (dry weight) 2.5 g | 9.6 g |
| water | 22 g |

The water/cement ratio is 0.28. The preparation is similar to that of the comparative examples.

Test 2

A grout similar to that of test 1 is prepared, in which the water content is adjusted to obtain a water/cement ratio of 0.35.

These five compositions are subjected to the following Theological measurements performed on a Rheomat 115 apparatus equipped with an MS DIN 145 cell. The grout is subjected to a shear increasing from 0 to 1000 s$^{-1}$ over 1 minute and then to a constant shear of 1000 s$^{-1}$ for 1 minute, and the shear is decreased to 0 s$^{-1}$ over 1 minute while the viscosity is measured. The final viscosity is recorded.

The tendency to segregation and to bleeding is evaluated:
by a static method: the appearance of a test tube filled with 200 ml of grout is observed over a period of 24 hours;
by a dynamic method under pressure: a given quantity of grout is placed in an API filter, above which an air pressure of 7×10$^5$ Pa is applied; the quantity of water expelled from the paste is measured and, after drying at 160° C., the solids content of the upper part (air side) and of the lower part (filter side) of the filter cake obtained is measured.

The solids content of the lower or upper sample of the cake is defined by the formula:

$$\text{solids content} = \frac{\text{total mass of the sample} - \text{mass of water from the sample}}{\text{total mass of the sample}} \times 100$$

A difference between the two values indicates a heterogeneous cake, a lower solids content higher than the upper solids content signifying a segregation.

The results are expressed by the following values:
the percentage of water collected by filtration $$Wc = \frac{\text{quantity of water collected}}{\text{initial quantity of grout}} \times 100$$

the water content of the cake after filtration $$Cf = \frac{\text{initial water} - \text{water collected by filtration}}{\text{mass of the filtered cake}} \times 100$$

relative to the initial water content of the grout Ci with $$Ci = \frac{\text{initial water}}{\text{mass of the initial cake}} \times 100$$

It is observed that, in relation to the comparative test 2, the combined addition of a silica suspension as defined in the invention and of a latex in test 2 results in bleeding properties which are superior to those obtained with the silica suspension alone.

Furthermore, it is observed that the addition of latex alone in the comparative test 3 results in a cement composition which has bad bleeding and segregation properties.

Consequently, the excellent antibleeding and segregation properties of the additives according to the invention are wholly unexpected, insofar as a person skilled in the art would have expected a decrease in the bleeding and segregation properties on combining an aqueous silica suspension with a latex, and not an improvement.

The results are collated in Table 2 below.

TABLE 2

| | | | Viscosity | Static bleeding | | Dynamic bleeding (retention of water under pressure) | | | | |
|---|---|---|---|---|---|---|---|---|---|---|
| Test | Additive | W/C | mPa s | Bleeding | Packing | Wc % | Cf % | Ci % | Upper solids content % | Lower solids content % |
| Comp. 1 | Silica alone | 0.28 | 140 (thixotropic behaviour) | none | none | 7.1 | 15.7 | 22 | 83 | 84 |
| Comp. 2 | Silica alone | 0.35 | 65 | light | yes | 10.5 | 17.2 | 26 | 80.7 | 85.4 |
| Comp. 3 | Latex alone | 0.28 | 80 | 3.5 ml | high | 5.5 | 17.3 | 22 | 0 (*) | 87 |
| 1 | Silica + latex | 0.28 | 93 | none | none | 9.5 | 13.7 | 22 | 86 | 86.4 |
| 2 | Silica + latex | 0.35 | 50 | none | none | 12.5 | 15.3 | 26 | 85 | 85 |

(*) Considerable separation resulting in filter blockage

From the above results it appears that the silica employed alone in the comparative test 1 produces a homogeneous grout which is stable but which has a tendency to form a gel on standing (which is, however, destructured under low shear). Nevertheless, when the W/C ratio increases, a tendency to bleeding and to packing (segregation) appears. In the dynamic bleeding test the cake obtained is more heterogeneous, which explains the packing observed in the static test. The silica is at the limit of effectiveness.

In the comparative test 3, the tendency to bleeding and to segregation is very great in static conditions and under pressure. The latex has no advantageous effect on these phenomena.

In test 1, a lesser tendency to gelling is noted in comparison with the comparative test 1, the behaviour of the grout being quasi-Newtonian. The grout does not present any bleeding or segregation problem: it remains perfectly homogeneous in both static and dynamic conditions, although it is much more fluid than the grout in the comparative test 1.

In test 2, while the W/C ratio is 0.35, the grout remains perfectly stable and homogeneous in static and dynamic conditions, in contrast to the grout of the comparative test 2.

Furthermore, although the grout is more fluid (50 mPa s against 65) a much better water retention is observed in test 2.

What is claimed is:

1. Aqueous suspension comprising a mixture of at least one aqueous suspension of precipitated silica and of at least one latex, wherein said aqueous suspension of precipitated silica has a solids content of between 10 and 40% by weight, has a viscosity lower than $4 \times 10^{-2}$ Pa s at a shear of $50 \text{ s}^{-1}$ and, after centrifuging at 7500 revolutions per minute for 30 minutes, produces a supernatant containing more than 50% of the weight of the silica initially in suspension, wherein said aqueous suspension is stable with regard to sedimentation for at least three months without stirring.

2. Suspension according to claim 1, wherein the latex comprises a product of polymerization of at least one monomer containing ethylenic unsaturation.

3. Suspension according to claim 1, wherein the latex has a particle size of 0.1 to 5 µm.

4. Suspension according to claim 1, wherein the latex has a particle size of at most 100 nm.

5. Suspension according to claim 1, comprising from 3 to 25 parts by weight of silica, expressed as dry weight, per 100 parts of suspension.

6. Suspension according to claim 1, comprising from 5 to 50 parts by weight of latex, expressed as dry weight, per 100 parts of suspension.

7. Suspension according to claim 2, wherein the at least one monomer containing ethylenic unsaturation is selected from the group consisting of styrene, butadiene, acrylic acid, methacrylic acid, esters of acrylic acid, esters of methacrylic acid, vinyl esters and mixtures thereof.

8. A method for the preparation of a concrete or cement composition, comprising incorporating the aqueous suspension according to claim 1.

9. The method according to claim 8, wherein said aqueous suspension is an antisegregation agent in a cement composition.

10. The method according to claim 8, wherein said aqueous suspension reduces the permeability to gases and to liquids in a concrete or cement composition.

11. The method according to claim 8, wherein said aqueous suspension allows water retention in a concrete or cement composition.

* * * * *